(12) United States Patent
Caron et al.

(10) Patent No.: US 7,221,277 B2
(45) Date of Patent: May 22, 2007

(54) RADIO FREQUENCY IDENTIFICATION TAG AND METHOD OF MAKING THE SAME

(75) Inventors: Michael Roger Caron, Cumberland Foreside, ME (US); Samuel V. Nablo, Acton, MA (US); John Paul Frazier, Scarborough, ME (US)

(73) Assignee: Tracking Technologies, Inc., Portland, ME (US)

( * ) Notice: Subject to any disclaimer, the term of this patent is extended or adjusted under 35 U.S.C. 154(b) by 146 days.

(21) Appl. No.: 10/958,699

(22) Filed: Oct. 5, 2004

(65) Prior Publication Data

US 2006/0071792 A1    Apr. 6, 2006

(51) Int. Cl.
*G08B 13/14* (2006.01)
*G06K 19/06* (2006.01)

(52) U.S. Cl. .................... 340/572.1; 235/492
(58) Field of Classification Search .. 340/568.1–568.8, 340/571, 572.1–572.9; 235/482, 492; 29/592.1, 29/600, 601, 592
See application file for complete search history.

(56) References Cited

U.S. PATENT DOCUMENTS

| 4,023,482 | A | * | 5/1977 | Swett et al. ................ 101/19 |
| 4,840,757 | A | * | 6/1989 | Blenkhorn .................. 264/485 |
| 5,955,949 | A | * | 9/1999 | Cocita ...................... 340/572.1 |
| 5,965,867 | A | * | 10/1999 | Haghiri-Tehrani .......... 235/492 |
| 6,121,878 | A | * | 9/2000 | Brady et al. .............. 340/572.1 |
| 6,515,586 | B1 | * | 2/2003 | Wymore ...................... 340/541 |
| 7,066,393 | B2 | * | 6/2006 | Stromberg et al. .......... 235/492 |
| 2001/0007335 | A1 | * | 7/2001 | Tuttle et al. ................ 235/492 |
| 2002/0070868 | A1 | * | 6/2002 | Jeutter et al. ............... 340/604 |
| 2004/0074974 | A1 | * | 4/2004 | Senba et al. ................ 235/492 |
| 2005/0179548 | A1 | * | 8/2005 | Kittel et al. ............. 340/568.2 |
| 2006/0071084 | A1 | * | 4/2006 | Detig et al. ................. 235/492 |

\* cited by examiner

*Primary Examiner*—Daniel Wu
*Assistant Examiner*—Jennifer Mehmood
(74) *Attorney, Agent, or Firm*—Pierce Atwood LLP; Kevin M. Farrell; Katherine A. Wrobel

(57) ABSTRACT

The present invention describes a process for manufacture of RFID tags. The RFID tag of the present invention includes a substrate, an antenna, and a die positioning structure disposed on the substrate that is cast and cured specifically for receiving a silicon die of the type typically used in RFID applications. The substrate is selected from a number of materials, the properties of which render it penetrable by electron beam radiation. The die positioning structure is a second material which is electron beam curable, and which is deposited and cured at high speed on the substrate in a novel fashion in accordance with the present invention in a highly efficient, reproducible and economical manner.

51 Claims, 6 Drawing Sheets

RADIO FREQUENCY IDENTIFICATION TAG AND METHOD OF MAKING THE SAME

BACKGROUND OF THE INVENTION

1. Field of the Invention

The present invention relates generally to the field of wireless communications, and specifically to the use of radio frequency transmissions to track the movement of commercial goods, as well as other suitable applications.

2. Description of the Related Art

Consumers are familiar with electronic systems for recognizing, tabulating, and indexing the movement of goods through the chain of commerce. Everyday examples include bar codes combined with optical scanners as found in a supermarket. More recently, some products and their containers have been "tagged" with radio frequency identification (RFID) transponders, which in combination with a radio frequency reader and sophisticated computer systems, enable a commercial enterprise to track inventory from a distance. An RFID system includes a tag, a reader, and a computer network connected to the reader for compiling the relevant data.

RFID tags generally consist of a substrate material in which an antenna is located for receiving and transmitting radio signals. The antenna is connected to a silicon chip, or die, which is encoded with data concerning the object to which the tag is attached. The die itself can be of several varieties, including read-only memory (ROM), electronically programmable read-only memory (EPROM), and electronically erasable programmable read-only memory (EEPROM). Depending on the type of die used, a tag may be able to store data, transmit data to the reader, and be reprogrammed to adapt to new data inputs.

RFID tags come in two forms: active and passive. An active tag includes a power supply, such as a battery, that provides enough current to actively transmit the necessary data from the RFID antenna to a distal receiver. A passive tag is generally smaller than an active tag, and it does not include an independent power source. Rather, a passive tag derives its power from incoming radiation, such as that from an inquiring reader. Due to the advantageous size, weight, and cost of a passive tag, they are generally considered superior to active tags for use with highly mobile retail items and containers, including, for example, books and shipping boxes.

In spite of the advantages of the passive tag, there are numerous problems encountered with their maintenance, operation, and manufacture. In particular, given the sheer volume of commerce and the potential market for RFID tags, there are currently severe limitations in the manufacturing process that hinder the mass production of suitable tags.

In the manufacture of an RFID tag, the silicon die must be precisely placed and connected to the antenna. The placement of the die is generally done through robotics via optical alignment, at which time the bonds between the die and the antenna must be formed. Once the antenna is bonded to the die, the bond is cured. The curing process typically involves heat or ultraviolet (UV) radiation that interacts with a chemical photoinitiator in the bonding agent, thereby accelerating the hardening process. In a typical process, an epoxy containing a UV sensitive photoinitiator is used to bond the die to the antenna. The UV radiation then illuminates the bond site with sufficient fluence of photons of approximately 3 electron volts (eV) energy, and after several seconds, the epoxy hardens and the bond is formed.

The process outlined above presents a number of complications that hinder the large-scale production of RFID tags. First, as the economic demand for RFID tags reaches into the billions of units per year, the 8–10 second UV-curing process effectively limits the supply that manufacturers can theoretically muster. Secondly, once the die is bonded to the antenna, there is no simple method for removing the die if it fails to perform in the pre-shipment tests. Consequently, an estimated 20–40% of the RFID tags that fail the tests are irrevocably lost, further limiting the supply and increasing the cost of tags to businesses and consumers.

Given the foregoing, there is a need in the art for a reliable, cost-effective, and easily produced RFID tag that is usable over a range of commercial applications. Moreover, there is a need for a novel production method that is capable of large-scale cost effective production of RFID tags with reliable testing parameters and a high production yield.

SUMMARY OF THE INVENTION

Accordingly, the present invention includes an efficient, reliable, and high fidelity RFID tag and a method of making the same. The RFID tag of the present invention includes a substrate, upon which an antenna for receiving and transmitting radio frequency signals may be printed. The RFID tag also includes a die positioning structure disposed on the substrate that is cast and cured specifically for receiving a silicon die of the type typically used in RFID applications. The silicon die is electrically connected to the antenna through at least one bond, which enables the RFID tag to transmit, receive, and possibly update electronic data stored on the silicon die through normal RFID protocols.

In varying embodiments, the RFID tag of the present invention is operable over a range of frequencies that enable it to be operable over a range of applications and jurisdictions. For example, the antenna may be selected such that it is operable between 400 and 1000 Megahertz. More particularly, for improved operation in the United States, the antenna may be selected to be operable between 915 and 920 Megahertz. For low frequency applications, the selected antenna would be operable between 100 and 150 kilohertz, while for microwave applications the antenna would be operable between 2.4 and 2.5 Gigahertz. Thus, the RFID tag of the present invention is readily adapted to use over a range of frequencies, and thus may be used in across a range of applications, from a variety of consumer products to automotive components and animal identification tags.

The novel RFID tag of the present invention is the result of an improved method of manufacture in the RFID industry. The method includes a number of acts, including providing a substrate with an antenna printed thereon and a second material. The substrate is generally of a dielectric material and hydrophobic, and should preferably be of low stopping power for electron beam radiation. The second material is curable by electron beam radiation, and is disposed on the substrate through a pressing mechanism that forms the die positioning structure discussed above. Once the die positioning structure is cured and affixed to the substrate, a silicon die is positioned within the die positioning structure and connected to the antenna through at least one bonding point. At this time, a manufacturer may provide a radio signal receivable by the antenna to test the electrical connections of the RFID tag. Once the operability of the RFID tag is confirmed, a protective cap or coating is disposed over the silicon die and the die positioning structure to increase the resiliency and abrasive resistance of the RFID tag.

The foregoing is intended as a summary of the novel and useful features of the present invention. Further aspects, features and advantages of the invention will become apparent from consideration of the following detailed description and the appended claims when taken in connection with the accompanying drawings.

DETAILED DESCRIPTION OF THE INVENTION

Figure 1:
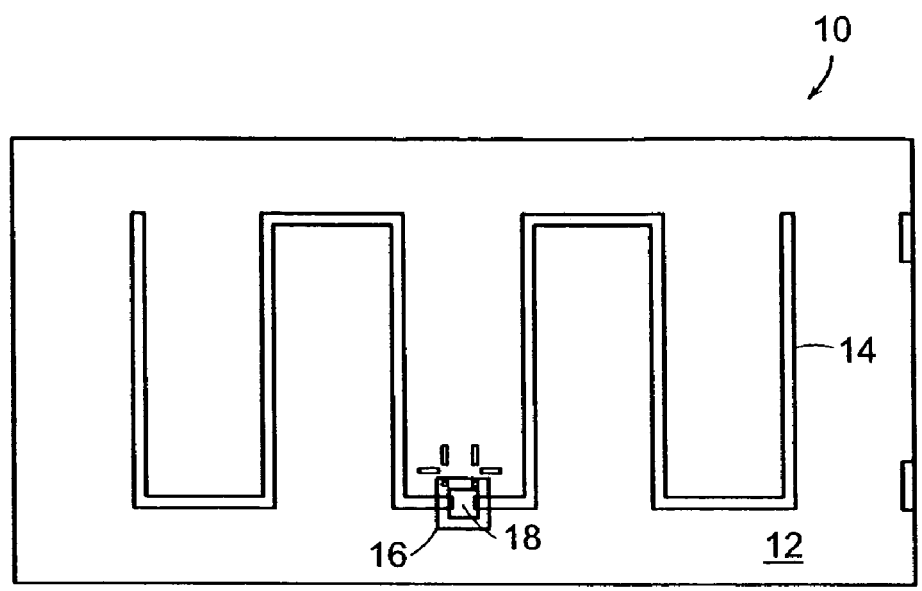
FIG. 1 is a plan view of an RFID tag in accordance with the present invention.

Two embodiments of the invention to accommodate the silicon die in a normal (bond pads up) and flip chip (bond pads down) orientation are presented here. In accordance with a preferred embodiment of the present invention, FIG. 1 illustrates a plan view of an RFID tag 10. The RFID tag 10 includes a substrate 12 and an antenna 14 that is located upon the substrate 12. The RFID tag 10 further includes a die positioning structure 16 in which a silicon die 18 is disposed.

Figure 2:
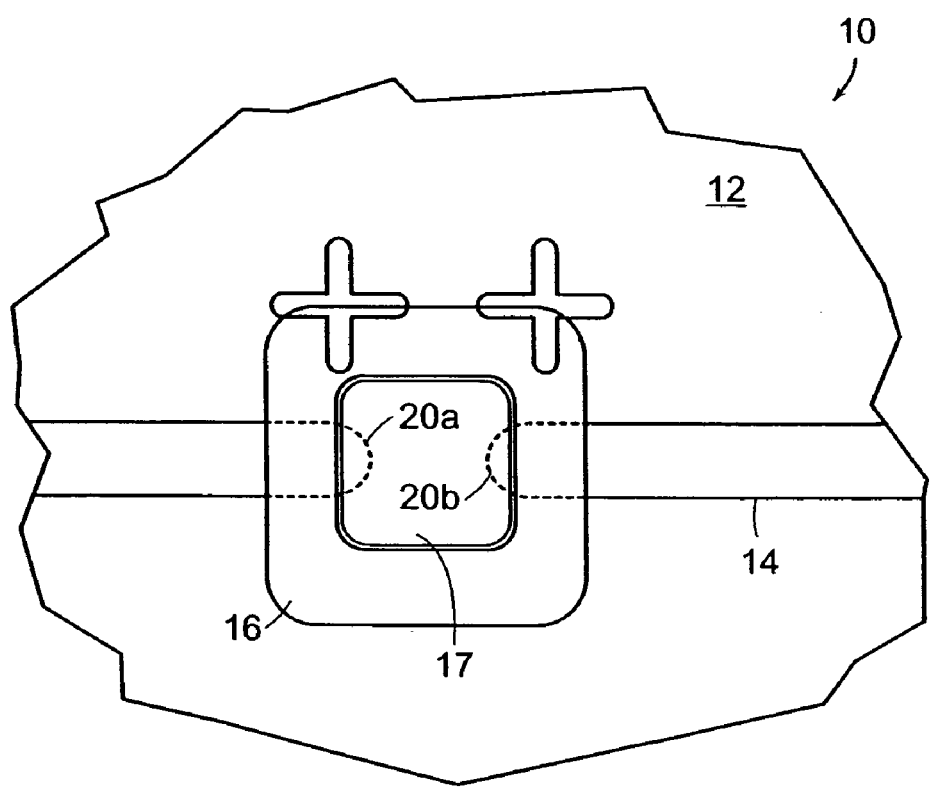
FIG. 2 is a detailed plan view of a typical RFID tag in accordance with the present invention.

The details of the RFID tag 10 are shown in FIG. 2, which is a detailed plan view of the present invention. As shown in FIG. 2, the die positioning structure 16 is disposed on the substrate 12 such that it overlaps the antenna 14. The die positioning structure 16 is disposed such that it substantially overlaps antenna leads 20a, 20b. The die positioning structure 16 defines in part a die positioning cavity 17, which is also located such that it substantially overlaps the antenna leads 20a, 20b in such a manner that one or both of the leads is available for (direct) bonding to the die bond pads, 19A and 19B, as shown in FIG. 4.

Figure 3:
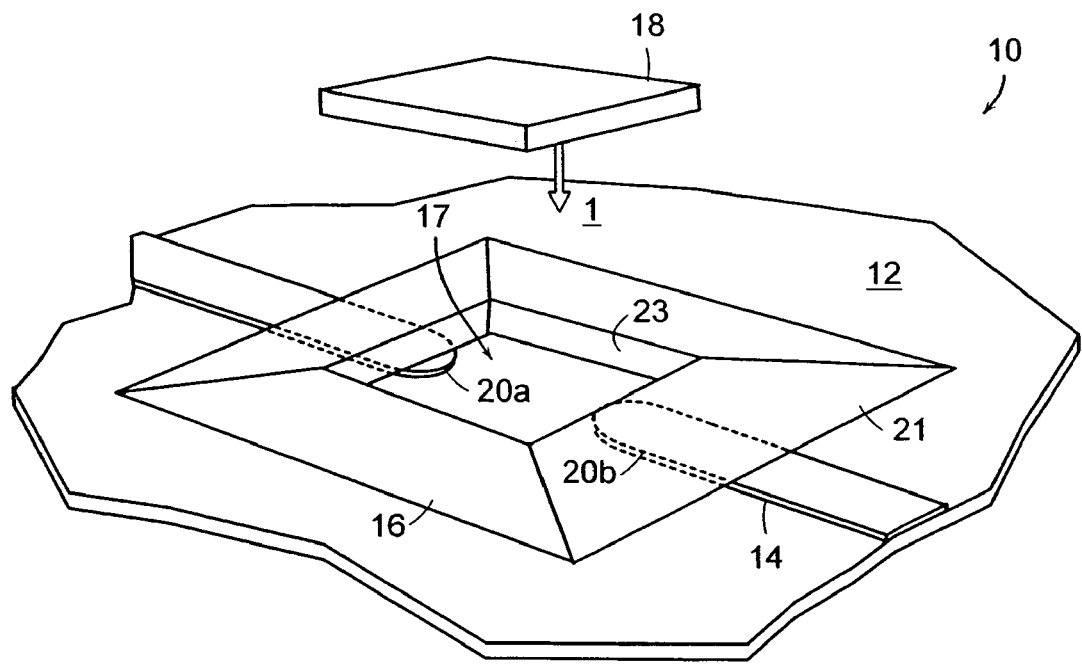
FIG. 3 is an oblique perspective view of an RFID tag in accordance with the present invention.

FIG. 3 is a perspective view of an RFID tag 10 in accordance with a preferred embodiment of the present invention. As shown in FIG. 3, the die positioning structure 16 defines in part an outer slope 21 and an inner slope 23. Further, the die positioning structure 16 is preferably disposed on the substrate 12 such that it overlaps the antenna 14. The die positioning structure 16 is disposed such that it substantially overlaps antenna leads 20a, 20b, and further such that the die positioning cavity 17 substantially overlaps the antenna leads 20a, 20b. The die positioning cavity 17 is adapted to receive the silicon die 18, which may be dropped into the die positioning cavity 17 in the direction of arrow 1.

Figure 4:
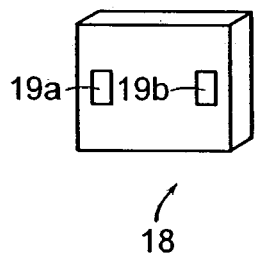
FIG. 4 is a perspective view of a typical silicon die in accordance with the present invention.

FIG. 4 is an oblique perspective view of a silicon die 18 illustrating a pair of contact points 19a, 19b that are electrically conductive and connectable to the antenna leads 20a, 20b shown as part of the RFID tag 10.

Figure 5:
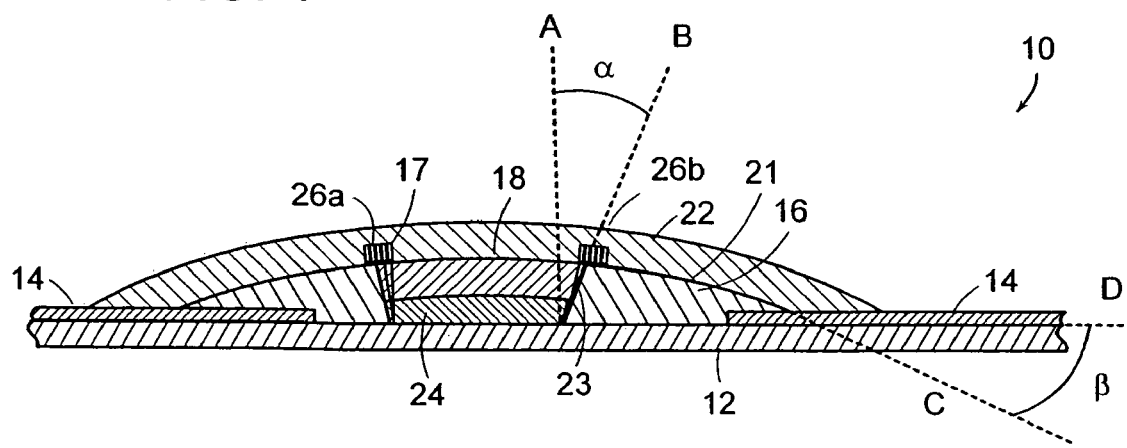
FIG. 5 is a cross-sectional view of an RFID tag in accordance with one embodiment of the present invention.

FIG. 5 is a cross-sectional view of an RFID tag in accordance with the present invention. In a preferred embodiment, the die positioning structure 16 defines the die positioning cavity 17. The die positioning cavity 17 defines an inner slope 23 that is angled relative to the surface of the substrate 12. Specifically, a first line A is defined normal to the surface of the substrate 12. A second line B is defined coplanar with the surface of the inner slope 23, and the angle between A and B is designated $\alpha$. In a preferred embodiment, the angle $\alpha$ is between 10 and 20 degrees, and is most preferably about 15 degrees. The angled face of the inner slope 23 allows for improved reliability and accuracy when positioning the silicon die 18 into the die positioning cavity 17.

The die positioning structure 16 also defines at least one outer surface 21 that is gradually sloped relative to the surface of the substrate 12. A third line C is defined coplanar with the surface of the outer surface 21. A fourth line D is defined coplanar with the surface of the substrate 12, and the angle between C and D is designated $\beta$. In a preferred embodiment, the angle $\beta$ is between 20 and 40 degrees, and is most preferably about 30 degrees. The angled face of the outer surface 21 allows for improved resistance to wear and tear to the RFID tag 10 or later coating and print rolls, and reduces the probability that any shearing forces or friction will dislodge the silicon die 18 from its connection to the antenna 14.

As shown in FIG. 5, the RFID tag 10 also provides for an alternate embodiment in which there is an underfill 24 disposed within the die positioning cavity 17 prior to the silicon die 18. The silicon die 18 is then bonded at bonds 26a, 26b to the die positioning structure 16, which is conductively connected to the antenna 14. A protective cap 22, preferably composed of non-conductive material, is disposed over the die positioning structure 16, the silicon die 18, and the bonds 26a, 26b to increase the resiliency and abrasion resistance of the RFID tag 10. Preferably, the protective cap 22 is treated with a blocking pigment to optically shield the die from photovoltaic action.

Referencing FIGS. 1–5 collectively, the RFID tag 10 is described in a preferred embodiment. The antenna 14 of the RFID tag 10 is produced from an electrically conductive material, such as a metal or metal alloy. Commonly employed metals for use in antennas include, for example, gold, copper, silver, aluminum, zinc or tungsten. In a more preferred embodiment, the antenna 14 is one of gold, copper, silver or aluminum. The antenna 14 is preferably printed or prefabricated on a suitable substrate 12 that should preferably be of low stopping power for electron beam radiation.

The type of application for which the RFID tag 10 is selected defines the antenna 14 specifications. In one embodiment, the antenna 14 is operable over a frequency range from 400 to 1000 Megahertz. In another embodiment, the antenna is operable over a frequency range from 915 to 920 Megahertz. For applications in which lower frequency radio transmissions are customary, the antenna 14 is operable over a frequency range of 100 to 150 kilohertz. For high frequency applications the antenna 14 is operable at 13.56 Megahertz. For use in foreign countries with differing frequency allocations, such as Europe, the antenna 14 is operable over a frequency range of 868 to 869 Megahertz. In Japan, however, it is proposed that the antenna 14 would be operable between 950 and 960 Megahertz. For some applications the antenna 14 may be operable over a frequency range of 2.4 to 2.5 Gigahertz. It should be evident from the foregoing that the type of antenna 14 selected for the RFID tag 10 will depend upon a number of factors, including government allocation rights and the type of signal needed for the particular application.

The substrate 12 can be any number of materials, but it is most preferably selected from a group of materials including polyimide, polyester, polyethylene, polypropylene, cotton-polyester blend, extrusion coated paper, impregnated paper, or thermal label. As noted, the substrate 12 should preferably be of low stopping power for electron beam radiation, as well as adaptable to a plurality of packaging options covering a wide range of commercial uses. In order to satisfy these conditions, the substrate 12 is preferably between 0.0025 and 0.0125 cm in thickness, thus being easily penetrable by electron beam radiation. In a more preferred embodiment, the substrate 12 is between 0.005 and 0.010 cm in thickness; and in a yet more preferred embodiment, the substrate 12 is between 0.006 and 0.008 cm in thickness.

The die positioning structure 16 is comprised of a non-conductive or dielectric material that is curable by electron beam (e-beam) radiation. E-beam radiation is a non-thermal method that uses high-energy electrons as the ionizing radiation to initiate polymerization and crosslinking reactions at controlled dose rates in polymeric materials. Electron curing has been employed in the converting industry for several decades—typically for the high speed curing of thin films, coatings or laminating adhesives. Some polymers (e.g., polyethylene) naturally cross link via e-beam treatment, while others such as most high-performance epoxies and acrylated copolymers, require modification to initiate curing. It has been shown that epoxies modified by the addition of photoinitiators, so that the addition polymerization can be initiated with ultraviolet radiation, can achieve electrical and thermomechanical properties comparable to those typical of thermal curing.

E-beam curing has several advantages over conventional thermal curing methods including: improved product quality/performance; reduced environmental, safety, and health concerns; improved material handling; ability to combine various materials and functions in a single operation; ability to utilize lower cost tooling; capability to produce unique parts that cannot be fabricated any other way; reduced energy consumption; and reduced cure times. In the context of the present invention a particularly important advantage is the ability to cure at near room temperature. Current thermal curing techniques for connecting bond pads to a substrate require exposure to temperatures within the range of 150 to 160 degrees C. for several seconds. The fact that this can be done quickly at room temperature using e-beam curing enables the use of thermolabile substrates (e.g., coated or impregnated papers or polymer films) as discussed above. Epoxy Technology (Billerica, Mass. 01821) offers a line of products described as UV-curable adhesives which, when modified, would be suitable for use in connection with e-beam curing methods. More specifically, the photoinitiator can be removed from the UV-curable adhesive for use in connection with e-beam curing methods. One skilled in the art would be familiar with a variety of other suitable e-beam curable polymer formulations.

In a preferred embodiment, the die positioning structure 16 is comprised of a material that is hydrophobic, and thus capable of seating the silicon die 18 while preventing any electromagnetic or moisture-caused interference with the operation of the RFID tag 10. Suitable materials include resins and epoxies that undergo rapid polymerization when exposed to electron beam radiation. In the flip-chip (bond pads down) embodiment, the die positioning structure 16 is preferably a strong insulator. A preferred insulating material is acrylated urethane, which has the necessary adhesive properties to properly bond to the substrate 14 while maintaining a degree of flexibility suitable for receiving the silicon die 18. In the normal (bond pads up) embodiment, shown in FIG. 5, the die positioning structure 16 may be conductive to permit ease of connection between the silicon die 18 and the antenna 14 disposed on the substrate 12. In this embodiment, the die positioning structure 16 is preferably a high-conductivity epoxy that is loaded or doped with a sufficient quantity of metal powder to lessen resistance. In each of the described embodiments, the die positioning structure 16 is treated with blocking pigments to optically shield the silicon die 18 from photovoltaic action.

The silicon die 18 is selected from a group of silicon dies that are adapted to coupling to an antenna 14 operable over a range of frequencies. In one embodiment, the silicon die 18 is selected from a group comprising a read-only memory chip (ROM), an electrically programmable read-only memory chip (EPROM), or an electrically erasable programmable read-only memory chip (EEPROM).

Figure 6:
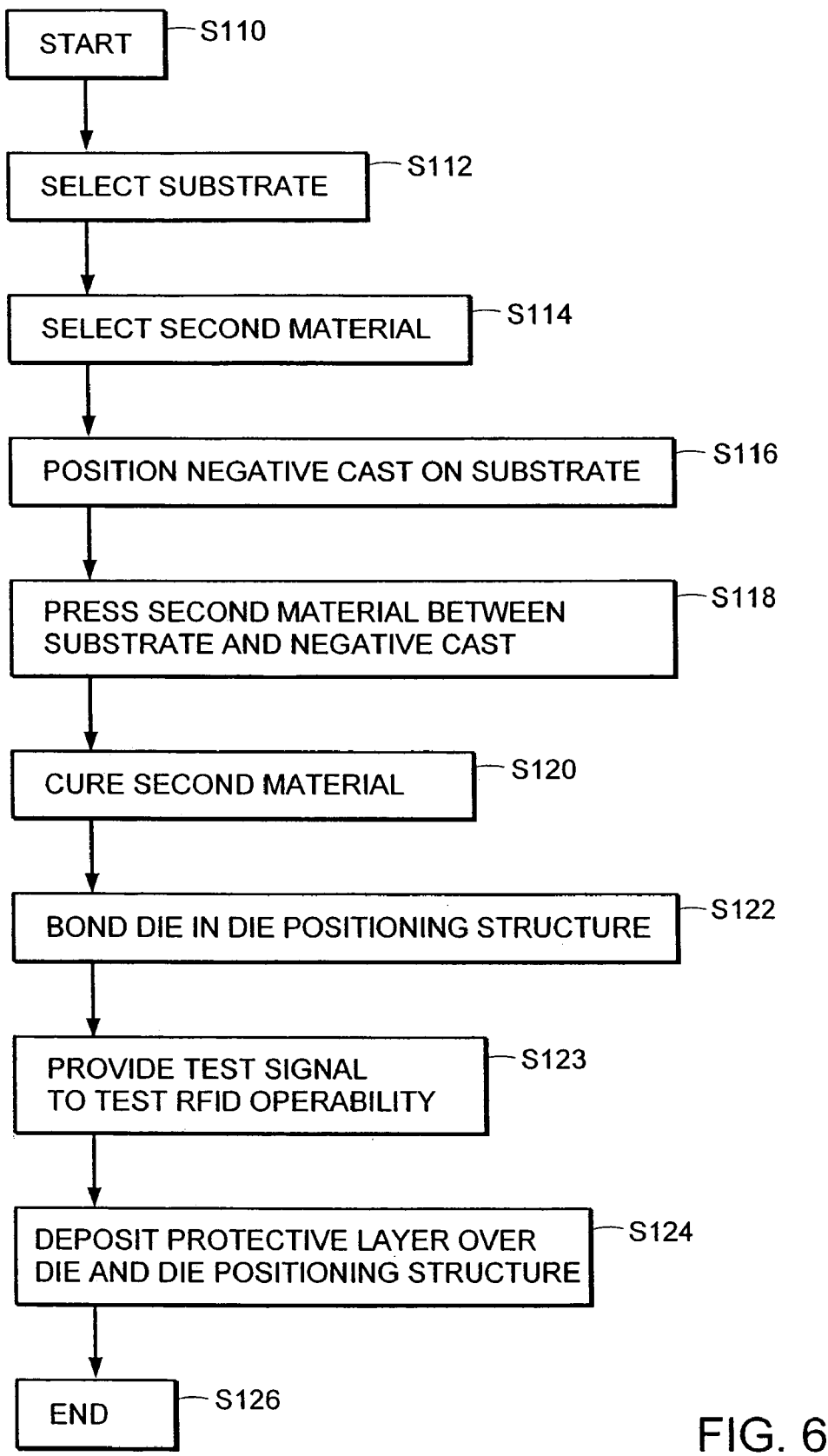
FIG. 6 is a flow chart depicting a method of making an RFID tag in accordance with the present invention.

A second aspect of the present invention is a method for making the improved RFID tag 10 described in detail above. FIG. 6 is a flow chart depicting a method of making the RFID tag 10 in accordance with the preferred embodiments of the present invention.

Starting at step S10, the method of the present invention provides that a substrate 12 is selected in step S112. As discussed above, with reference to the RFID tag 10, the substrate 12 can be any number of materials, but it is most preferably selected from a group of materials including polyimide, polyester, polyethylene, polypropylene, cotton-polyester blend, extrusion coated paper, impregnated paper, or thermal label.

As previously noted, the substrate 12 should be a poor absorber of electron beam radiation, as well as adaptable to a plurality of packaging options covering a wide range of commercial uses. In order to satisfy these conditions, the substrate 12 is preferably between 0.0025 and 0.0125 cm in thickness, thus being penetrable to electron beam radiation. In a more preferred embodiment, the substrate 12 is between 0.005 and 0.010 cm in thickness; and in a yet more preferred embodiment, the substrate 12 is between 0.006 and 0.008 cm in thickness. The substrate 12 should preferably have an antenna 14 located thereon, or be readily adapted to receive an antenna 14 of the like discussed above.

In step S114, a second material is selected, the second material being adapted for use as the die positioning structure 16 discussed above. The die positioning structure 16 is comprised of an insulating or dielectric material that is curable by electron beam radiation. The die positioning structure 16 is preferably comprised of a material that is hydrophobic and capable of securely seating the silicon die 18 while preventing any electromagnetic or moisture interference with the operation of the RFID tag 10. Lastly, the die positioning structure 16 is preferably treated with blocking pigments to optically shield the silicon die 18 from photovoltaic action.

In step S116, a negative cast of the die positioning structure is positioned such that as the second material is disposed between the substrate and the negative cast, a die positioning structure 16 will be formed following the filling of the engraving (negative cast) with the second material step S118.

Once the second material is pressed into a die positioning structure 16 in step S118, the second material is cured in step S120. The curing step comprises using electron beam radiation to polymerize the second material and render the die positioning structure 16. In a preferred embodiment, the step of curing the second material comprises using an electron beam with energy in the range of 100 to 300 kilo-electron volts (keV). Most preferably, the energy of the curing electron beam is approximately 200 keV.

Following the electron beam curing of the second material in step S120, the silicon die 18 is bonded to the die positioning structure 16 and the antenna 14 in step S122. The functionality of the RFID tag 10 can then be tested in step S123 by providing a sample radio signal and measuring the response of the RFID tag 10.

After the RFID tag 10 has been successfully tested, a protective coating is deposited over the silicon die 18 and the die positioning structure 16 in step S124. The protective layer 22 is preferably composed of non-conductive material and disposed over the die positioning structure 16, the silicon die 18, and the bonds 26a, 26b to increase the resiliency of the RFID tag 10. Preferably, the protective layer 22 is treated with a blocking pigment to optically shield the silicon die 18 from photovoltaic action. Step S126 represents the termination of the method of making the improved RFID tag 10, but it is understood that the method can be repeated continuously to generate a large stock of RFID tags suitable for use across an array of commercial enterprises.

Figure 7:
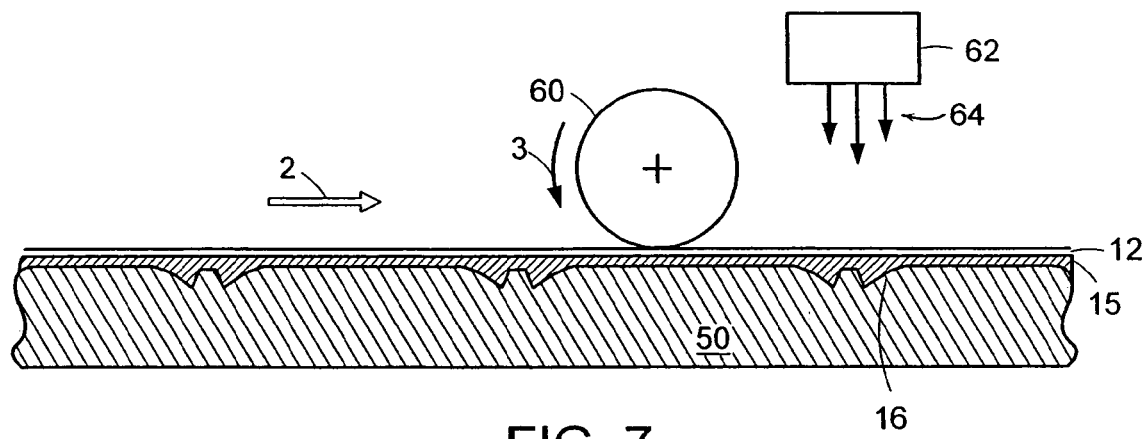
FIG. 7 is a schematic view of a method of making a die positioning structure for an RFID tag in accordance with the present invention.

The method of making the RFID tag 10 of the present invention can also be described with reference to a system that accomplishes the method of making the same. FIG. 7 is a schematic view of one method of making an RFID tag 10, including a substrate 12 and a second material 15 suitable for use as a die positioning structure 16. In this embodiment of the method, a negative cast 50 is shown directly adjacent to the second material 15. A pressing mechanism 60 is disposed above the substrate 12, second material 15, and negative cast 50. The pressing mechanism 60 is movable with respect to the negative cast 50, or the pressing mechanism 60 may be fixed relative to the negative cast 50, such that a volume of the second material 15 may be passed through the system.

As shown in FIG. 7, the pressing mechanism 60 is rotatable along a central axis along arrow 2. The negative cast 50 is movable along arrow 3, such that the pressing mechanism 60 is always pressing new materials into the negative cast 50. Following the pressing step of the present method, an electron beam generator 62 is provided for generating electron beams 64 which cure the second material 15 into the die positioning structure 16 as discussed above. In a preferred embodiment, the electron beam has an energy in the range of 100 to 300 kiloelectron volts (keV). Most preferably, the energy of the curing electron beam is approximately 200 keV.

Figure 8:
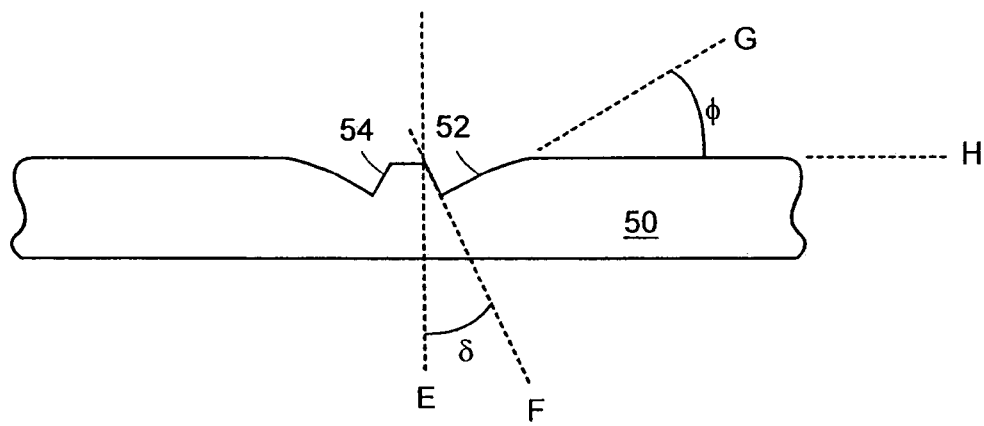
FIG. 8 is a cross-section view of a negative cast usable in the making of the die positioning structure in accordance with the present invention.
Figure 9:
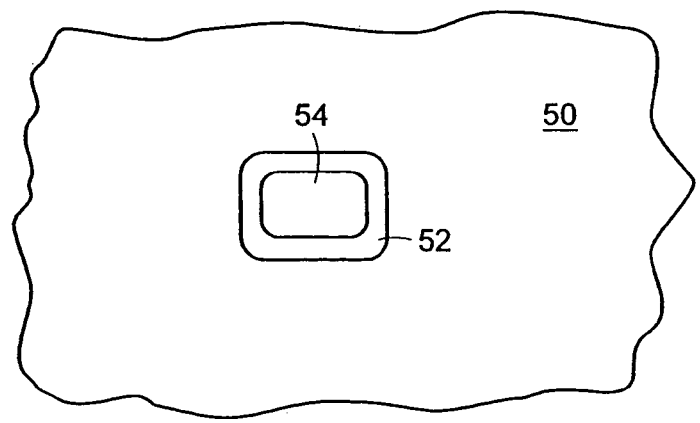
FIG. 9 is a plan view of a negative cast usable in making the die positioning structure in accordance with the present invention.

FIG. 8 is a cross-sectional view of a preferred negative cast 50 usable in the making of an RFID tag 10. FIG. 9 is a plan view of the preferred negative cast 50. The shape defined by the negative cast 50 is the inverse of the shape defined by the die positioning structure 16, discussed above in detail. The negative cast 50 defines an inner bank 54 and an outer bank 52. Line E is defined as normal to the surface of the negative cast 50. Line F is defined as coplanar with the surface of the inner bank 54, and the angle between lines E and F is designated δ. The angle δ is preferably between 10 and 20 degrees, and most preferably it is approximately 15 degrees.

The outer bank 52 of the negative cast 50 is more gradually sloped in order to cast a die positioning structure 16 that has an outer slope 21 of the characteristics shown in FIG. 3. A line H is defined as coplanar with the negative cast 50. A line G is defined as coplanar with the outer bank 52, and the angle between lines G and H is designated φ. The angle φ is preferably between 20 and 40 degrees, and is most preferably approximately 30 degrees.

Figure 10:
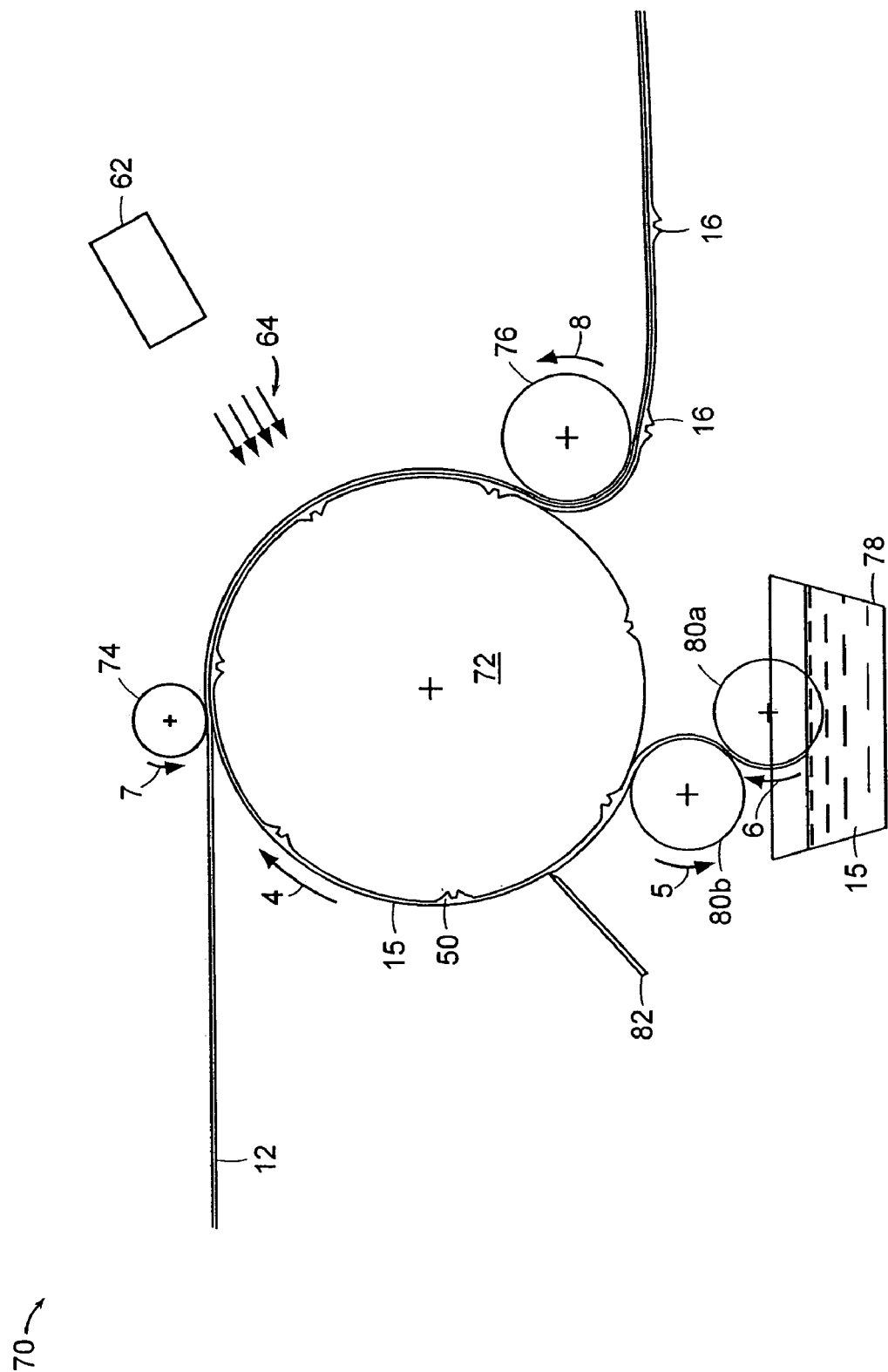
FIG. 10 is a schematic view of a method of making the die positioning structure on a substrate in accordance with the present invention.

FIG. 10 is a schematic view of a method 70 of making the die positioning system on substrate in accordance with the present invention. The schematic representation of the method 70 is not intended to limit the scope of the claims herein, rather it is intended as an example of a systematic method for the production of RFID tags 10 in accordance with the present invention.

In one representation of the method 70, a substrate 12 is continuously fed over a first cylinder 72, which rotates about a central axis in the direction of arrow 4. The first cylinder 72 has a plurality of negative casts 50 disposed on its surface in a sequence matching the tag dimensions. The second material 15 is disposed in a pan 78 in liquid form. A second cylinder 80a (typically engraved) and third cylinder 80b (typically a rubber roll), rotatable in opposing directions shown by arrows 5 and 6, remove the second material 15 from the pan 78 and apply it to the first cylinder 72. A doctor blade 82 cleans the first cylinder 72 of any excess second material 15.

The substrate 12 is disposed on the second material 15. A fourth cylinder 74 rotatable in the direction of arrow 7 serves a pressing mechanism for pressing the second material 15 into the negative cast 50 on the surface of the first cylinder 72. An electron beam generator 62 is disposed at a distance from the first cylinder 72 for generating electron beams 64 which cure the second material 15 into the die positioning structure 16, as discussed above. In a preferred embodiment, the electron beam has an energy in the range of 100 to 300 kilo-electron volts (keV). Most preferably, the energy of the curing electron beam is approximately 200 keV. After curing, a fifth idler cylinder 76 removes the cured second material 15 from the first cylinder 72. As described above, the newly formed die positioning structure 16 and the substrate 12 are adapted for the receipt of a silicon die 18 and the remaining steps of the method claimed herein.

Figure 11:
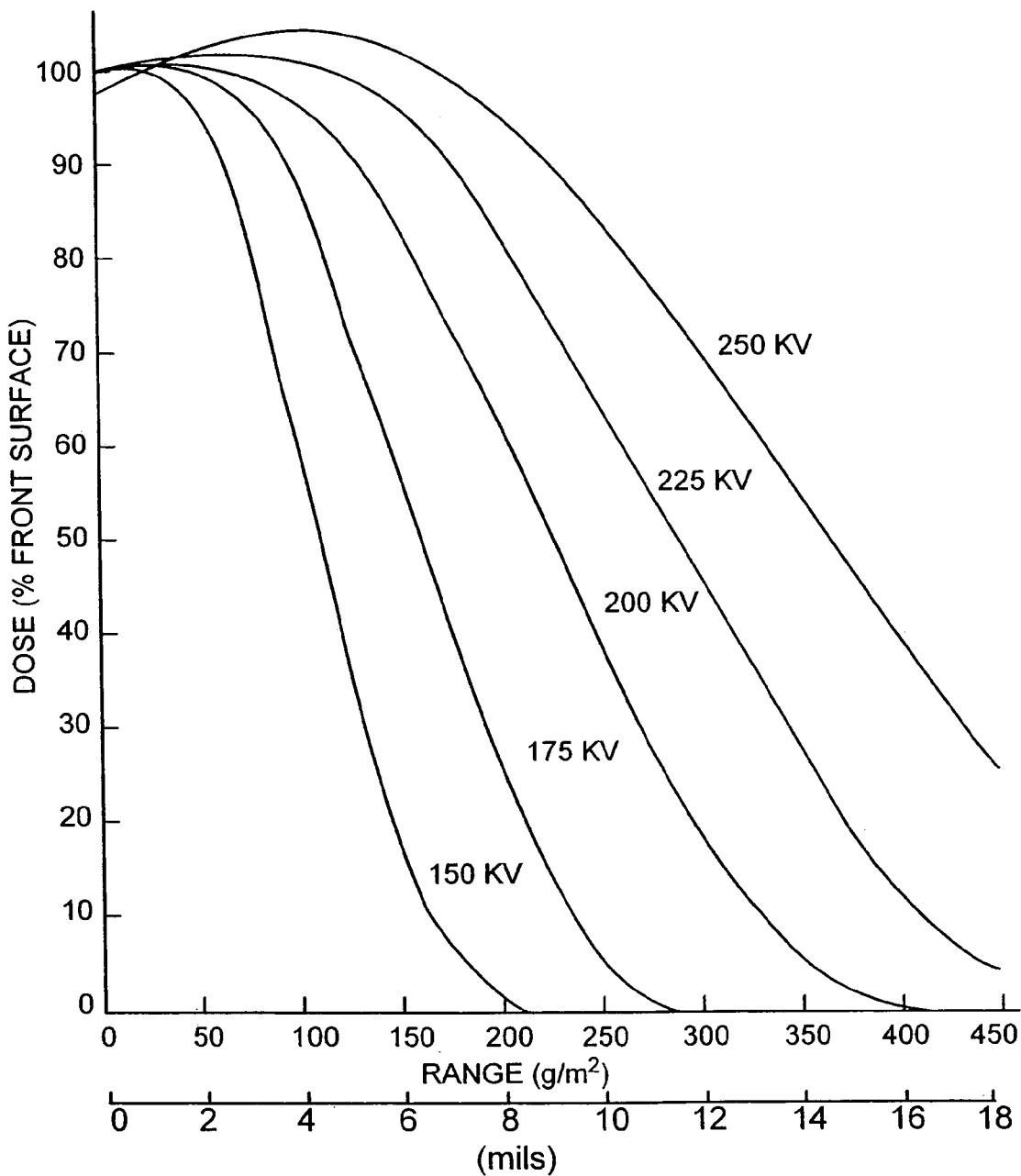
FIG. 11 is a graph of electron penetration as a function of energy.

FIG. 11 is a graph illustrating relationship between the penetration range (grams/meters$^2$) and dosage penetration percentage (%) as a function of electron beam energy. As previously noted, an electron beam generator 62 is utilized for generating electron beams 64 which cure the second material 15 into the die positioning structure 16. In a preferred embodiment, the electron beam has an energy in the range of 100 to 300 kilo-electron volts (keV). in a most preferred embodiment, the energy of the curing electron beam is approximately 200 keV.

The present invention as described in its preferred embodiments thus improves the procedure of manufacture of RFID tags in addition to providing a specific method for a novel RFID tag. In particular, the formation of the die positioning structure by systematic and reliable means on a selected substrate will provide a more reliable and resilient RFID tag. Moreover, by electron beam curing the die positioning structure, the pace of production of the RFID tags can be significantly increased, permitting the use of RFID tags in an ever broadening field of commercial applications.

It should be apparent to those skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

We claim:

1. A radio frequency identification (RFID) tag comprising:
   a substrate material;
   an antenna disposed on the substrate;
   a die positioning structure disposed on the substrate and defining a cavity for receiving a silicon die; and
   a silicon die disposed in the die positioning structure, and in contact with the die positioning structure, the silicon die having at least one bond for connecting to the antenna.

2. The RFID tag of claim 1 wherein the die positioning structure defines a cavity, and further wherein the cavity defines a first surface adjacent to the substrate and a second surface, the second surface disposed at an angle relative to the first surface, the angle being between 100 and 110 degrees.

3. The RFID tag of claim 1 wherein the antenna is selected from the group consisting of gold, copper, silver, aluminum, zinc or tungsten.

4. The RFID tag of claim 1 wherein the antenna is gold.

5. The RFID tag of claim 1 wherein the antenna is copper.

6. The RFID tag of claim 1 wherein the antenna is silver.

7. The RFID tag of claim 1 wherein the antenna is aluminum.

8. The RFID tag of claim 1 wherein the substrate is selected from the group consisting of polyimide, polyester, polyethylene, polypropylene, cotton-polyester blend, extrusion coated paper, impregnated paper, or thermal label.

9. The RFID tag of claim 1 wherein the substrate comprises polyimide.

10. The RFID tag of claim 1 wherein the substrate comprises polyester.

11. The RFID tag of claim 1 wherein the substrate comprises polyethylene.

12. The RFID tag of claim 1 wherein the substrate comprises polypropylene.

13. The RFID tag of claim 1 wherein the substrate comprises of one of cotton-polyester blend.

14. The RFID tag of claim 1 wherein the substrate comprises extrusion coated paper.

15. The RFID tag of claim 1 wherein the substrate comprises impregnated paper.

16. The RFID tag of claim 1 wherein the substrate comprises thermal label.

17. The RFID tag of claim 1 wherein the substrate is between 0.0025 and 0.0125 cm in thickness.

18. The RFID tag of claim 1 wherein the substrate is between 0.005 and 0.01 cm in thickness.

19. The RFID tag of claim 1 wherein the substrate is between 0.006 and 0.008 cm in thickness.

20. The RFID tag of claim 1 wherein the silicon die is one of a read-only memory chip, an electrically programmable read-only memory chip, or an electrically erasable programmable read-only memory chip.

21. The RFID tag of claim 1 wherein the antenna is operable between 915 and 920 Megahertz.

22. The RFID tag of claim 1 wherein the antenna is operable between 868 and 869 Megahertz.

23. The RFID tag of claim 1 wherein the antenna is operable between 100 and 150 kilohertz.

24. The RFID tag of claim 1 wherein the antenna is operable between 950 and 960 Megahertz.

25. The RFID tag of claim 1 wherein the antenna is operable between 2.4 and 2.5 Gigahertz.

26. A method of manufacture for a radio frequency identification (RFID) tag, the method comprising:
   providing a substrate;
   providing an antenna preformed on the substrate;
   providing a second material;
   providing a negative cast of a die positioning structure;
   pressing the second material between the substrate and the negative cast, thereby providing a die positioning structure;
   curing the second material, thereby providing a cured die positioning structure; and
   affixing a silicon die within the cured die positioning structure, such that the silicon die is in contact with the cured die positioning structure.

27. The method of claim 26 wherein the step of curing the second material comprises irradiating the second material with an electron beam.

28. The method of claim 26 wherein the step of curing the second material comprises irradiating the second material with an electron beam having an energy of between 100 and 300 kiloelectron volts.

29. The method of claim 26 wherein the step of curing the second material comprises irradiating the second material with an electron beam having an energy of 200 kiloelectron volts.

30. The method of claim 25 wherein the substrate is selected from the group consisting of polyimide, polyester, polyethylene, polypropylene, cotton-polyester blend, extrusion coated paper, impregnated paper, or thermal label.

31. The method of claim 25 wherein the substrate comprises polyimide.

32. The method of claim 25 wherein the substrate comprises polyester.

33. The method of claim 25 wherein the substrate comprises polyethylene.

34. The method of claim 25 wherein the substrate comprises polypropylene.

35. The method of claim 25 wherein the substrate comprises cotton-polyester blend.

36. The method of claim 25 wherein the substrate comprises extrusion coated paper.

37. The method of claim 25 wherein the substrate comprises impregnated paper.

38. The method of claim 26 wherein the substrate comprises thermal label.

39. The method of claim 26 wherein the substrate is between 0.0025 and 0.0125 cm in thickness.

40. The method of claim 26 wherein the substrate is between 0.005 and 0.01 cm in thickness.

41. The method of claim 26 wherein the substrate is between 0.006 and 0.008 cm in thickness.

42. The method of claim 26 wherein the step of providing a negative cast of a die positioning structure comprises providing a platen.

43. The method of claim 42 wherein the platen is comprised of brass.

44. The method of claim 42 wherein the step of providing a negative cast of a die positioning structure comprises providing a platen disposed for repeated pressing of the negative cast of the die positioning structure.

45. The method of claim 42 wherein the platen is a cylinder disposed for continuous rolling.

46. The method of claim 26 further comprising the step of applying bonding adhesives to at least one antenna contact point, the antenna contact point disposed in the die positioning structure.

47. The method of claim 26 wherein the silicon die is one of a read-only memory chip, an electrically programmable read-only memory chip, or an electrically erasable programmable read-only memory chip.

48. The method of claim 26 wherein the silicon die is an electrically erasable programmable read-only memory chip.

49. The method of claim 26 further comprising the step of providing a non-conductive protective layer protecting the silicon die and the die positioning structure.

50. The method of claim 26 further comprising the step of irradiating the antenna with electromagnetic radiation to test the operability of the RFID tag.

51. The method of claim 26 further comprising the step of introducing ultraviolet radiation blocking pigments into the second material.

* * * * *